(12) United States Patent
Todokoro

(10) Patent No.: US 9,266,577 B2
(45) Date of Patent: Feb. 23, 2016

(54) RIDING TOY

(71) Applicant: AGATSUMA CO., LTD, Tokyo (JP)

(72) Inventor: Shinji Todokoro, Tokyo (JP)

(73) Assignee: AGATSUMA CO., LTD., Tokyo (JP)

( * ) Notice: Subject to any disclaimer, the term of this patent is extended or adjusted under 35 U.S.C. 154(b) by 0 days.

(21) Appl. No.: 13/644,265

(22) Filed: Oct. 4, 2012

(65) Prior Publication Data

US 2013/0087990 A1 Apr. 11, 2013

(51) Int. Cl.
*B62K 9/00* (2006.01)
*B62J 6/10* (2006.01)
*B62J 6/16* (2006.01)

(52) U.S. Cl.
CPC ... *B62K 9/00* (2013.01); *B62J 6/10* (2013.01); *B62J 6/16* (2013.01)

(58) Field of Classification Search
CPC ............ B62K 9/00; B62K 9/02; A63H 17/28; A63H 17/268; A63H 17/32; A63H 17/34; A63H 7/04; B62J 6/00; B62J 6/12
USPC ................ 180/65.1, 19.1; 280/87.01, 87.021, 280/87.051, 304.2; 446/465, 468, 470, 457, 446/440, 438, 463, 462, 409
See application file for complete search history.

(56) References Cited

U.S. PATENT DOCUMENTS

| | | | | |
|---|---|---|---|---|
| 1,434,701 A * | 11/1922 | Hudry | ........................... | 280/7.15 |
| 4,152,866 A * | 5/1979 | Suda | .............................. | 446/463 |
| 4,261,588 A * | 4/1981 | Kassai | ......................... | 280/7.17 |
| 4,360,860 A * | 11/1982 | Johnson et al. | ................ | 362/192 |
| 4,823,632 A * | 4/1989 | Harrod et al. | .................... | 74/342 |
| 6,161,847 A * | 12/2000 | Howell et al. | .................... | 280/30 |
| 6,405,817 B1 * | 6/2002 | Huntsberger et al. | ......... | 180/65.1 |
| 6,408,967 B1 * | 6/2002 | Huntsberger et al. | ......... | 180/65.1 |
| 6,412,787 B1 * | 7/2002 | Pardi et al. | .................. | 280/1.202 |
| 6,695,327 B1 * | 2/2004 | Maggiore et al. | ......... | 280/87.051 |
| D564,040 S * | 3/2008 | Kurth et al. | ................... | D21/433 |
| 7,411,307 B2 * | 8/2008 | Uno | .............................. | 290/1 R |
| 7,525,204 B2 * | 4/2009 | Kitamura | ...................... | 290/1 R |
| 7,568,538 B2 * | 8/2009 | Drosendahl et al. | ......... | 180/65.1 |
| 7,628,518 B2 * | 12/2009 | Fujii et al. | ...................... | 362/476 |
| 7,841,922 B2 * | 11/2010 | Discoe et al. | .................. | 446/465 |
| 7,950,978 B2 * | 5/2011 | Norman et al. | ................. | 446/454 |
| 8,091,656 B2 * | 1/2012 | Rankin et al. | ................ | 180/19.1 |
| 8,397,844 B2 * | 3/2013 | Vasant | ......................... | 180/65.1 |
| 8,517,403 B2 * | 8/2013 | Jessie, Jr. | ................. | 280/87.041 |
| 2005/0252702 A1* | 11/2005 | Haney | ........................... | 180/65.1 |
| 2006/0232988 A1* | 10/2006 | Wang et al. | ................... | 362/475 |
| 2009/0264044 A1* | 10/2009 | Paculdo | ......................... | 446/303 |
| 2010/0276219 A1* | 11/2010 | Rankin et al. | .............. | 180/65.31 |

* cited by examiner

*Primary Examiner* — Katy M Ebner
*Assistant Examiner* — Emma K Frick
(74) *Attorney, Agent, or Firm* — The Marbury Law Group, PLLC

(57) ABSTRACT

A riding toy, free from maintenance work like battery replacement and able to urge a rider to take exercise while preventing the rider from getting tired thereof, has one front wheel and two rear wheels that are provided rotatably on a body, a generating motor linked with the rear wheels via a power transmission mechanism, a rectifier bridge circuit rectifying an output current from the generating motor, a storage unit storing a direct current from the rectifier bridge circuit, button switches of a button group on the body or a handlebar, an output unit on the handlebar including a sound emitting device or a light emitting device and a control unit causing the light emitting device or the sound emitting device of the output unit to perform a predetermined operation in response to operation of the button switches based on a current supplied from the storage unit.

6 Claims, 4 Drawing Sheets

RIDING TOY

CROSS-REFERENCE TO RELATED APPLICATION

This application is based upon and claims the benefit of priority under 35 USC 119 of Japanese Utility Model Application No. 2011-005849 filed on Oct. 5, 2011, the entire contents of which, including the description, claims, drawings and abstract, are incorporated herein by reference.

BACKGROUND OF THE INVENTION

1. Field of the Invention

The present invention relates to a riding toy.

2. Description of the Related Art

As a riding toy, a riding toy is known on which an infant rides and which can be moved by the infant kicking on the ground with its own feet (for example, refer to Japanese Unexamined Patent Publication (KOKAI) No. 2002-35435).

A riding toy is also known in which a loud speaker, button switches and a sound generating electronic circuit using a primary battery as its power supply are mounted on a body of the riding toy. In this riding toy, when a button switch is operated, the sound generating electronic circuit causes an artificial engine sound to be emitted towards a rider from the loud speaker to enjoy the rider in moving the riding toy. Thus, this riding toy is effective in urging the rider to take exercise while enjoying itself.

BRIEF SUMMARY OF THE INVENTION

In the riding toy in which the sound generating electronic circuit using the primary battery as its power supply is mounted, however, since the primary battery is adopted as its power supply, maintenance work such as replacement of batteries needs to be done on the riding toy periodically. Due to this, a riding toy has been demanded which is free from such maintenance work as battery replacement.

Additionally a riding toy has also been demanded which can urge further an infant who rides thereon to take exercise willingly.

The invention has been made in view of the problems inherent in the related art riding toys, and an object of the invention is to provide a riding toy which can obviate the necessity for maintenance work such as replacement of batteries and which can urge a rider to take exercise while preventing the rider from getting tired of exercise.

According to an aspect of the invention, there is provided a riding toy in which a handlebar and rotatable wheels are provided on a body thereof, comprising a button switch provided on the body or the handlebar, an output unit that is provided on the handlebar and which is made up of a light emitting device or a sound emitting device, a generating motor that is linked with the wheels via a power transmission mechanism, a rectifier bridge circuit that rectifies an output current outputted from the generating motor, a storage unit that stores a direct current from the rectifier bridge circuit, and a control unit that causes the light emitting device or the sound emitting device of the output unit to perform a predetermined operation in response to operation of the button switch based on an current supplied from the storage unit.

Additionally, in the riding toy of the invention, the handlebar includes a control panel assembly in which a plurality of the button switches are disposed, and the control unit causes the sound emitting device or the light emitting device to perform a predetermined operation in response to operation of each of the plurality of button switches based on a current supplied from the storage unit.

Further, in the riding toy of the invention, the power transmission mechanism includes an engaging and disengaging unit that is adapted to connect and disconnect the transmission of power between the wheels and the generating motor.

In addition, in the riding toy of the invention, a grip member is provided at a rear part of the body.

According to the invention, the riding toy can be provided that obviates the necessity for maintenance work such as battery replacement and which can urge the rider to take exercise while preventing the rider from getting tired of exercise.

Additionally, according to the invention, the handlebar includes the control panel assembly and various light or sound is emitted in response to operation of each of the plurality of button switches. Thus, the riding toy can be provided that enables the infant who is the rider of the riding toy to operate the button switches on the control panel assembly easily and which can urge the infant to take exercise while preventing the infant from getting tired of exercise.

Further, according to the invention, the transmission of power is connected and disconnected between the wheels and the generating motor by the engaging and disengaging unit. For example, when the transmission of power between the wheels and the generating motor is disconnected, the riding toy can be provided which can reduce the load in exercise of the infant who is the rider of the riding toy by reducing the rotational resisting force of the wheels.

In addition, according to the invention, the riding toy can be provided that can easily assist the rider in taking exercise and which can reduce the rotational load produced when electric energy is generated by allowing a person who is not riding the riding toy, for example, a protector or the like to protect the infant who is riding on the riding toy to grip on the grip member provided at the rear part of the body to push forwards or pull backwards the grip member to move the riding toy accordingly.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Figure 1:
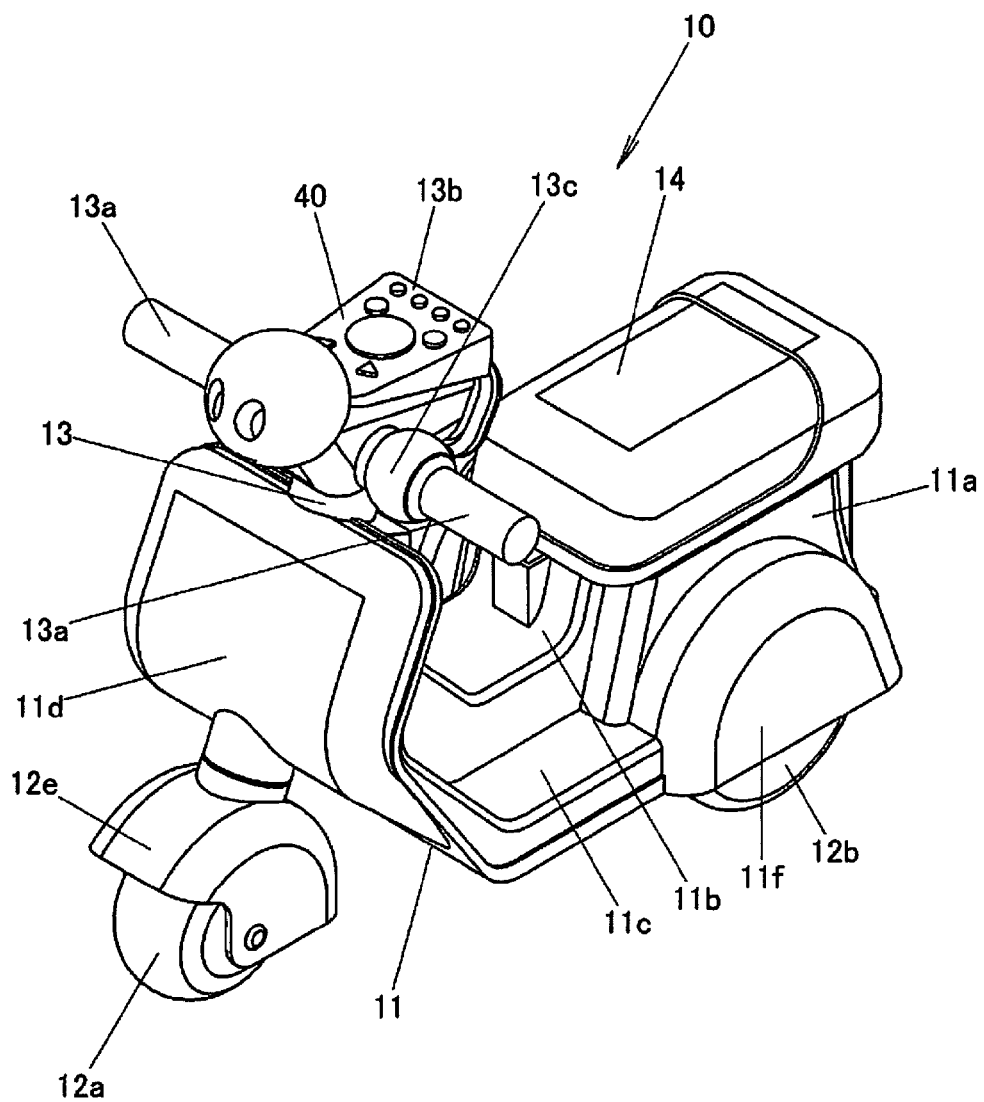
FIG. 1 is a perspective view showing an external appearance of a riding toy according to an embodiment of the invention.

Hereinafter, a mode for carrying out the invention will briefly be described. A riding toy 10 according to an aspect of the invention is a riding toy 10 including a handlebar 13, a front rotatable wheel 12a and rear rotatable wheels 12b which are provided on a body 11 of the riding toy 10. The riding toy 10 comprises a button group 41 including button switches which are provided on the body 11 or the handlebar 13, an output unit 44 that is provided on the handlebar 13 and which is made up of a sound emitting device 43 or a light emitting device 42, a generating motor 33 which is linked with the wheels via a power transmission mechanism 31, a rectifier bridge circuit 35 which rectifies an output current outputted from the generating motor 33, a storage unit 37 which stores a direct current from the rectifier bridge circuit 35 and a control unit 39 which makes the sound emitting device 43 or the light emitting device 42 of the output unit 44 perform a predetermined operation in response to operation of each of the button switches based on a current supplied from the storage unit 37.

Additionally, in the riding toy 10, the handlebar 13 includes a control panel assembly 40 on which the plurality of button switches of the button group 41 are disposed. The control unit 39 makes the sound emitting device 43 or the light emitting device 42 perform a predetermined operation in response to operation of each of the plurality of button switches of the button group 41 based on the current supplied from the storage unit 37.

Further, in the riding toy 10, the power transmission mechanism 31 includes an engaging and disengaging unit 50 that connects or disconnects the transmission of power between the rear wheels 12b which are the wheels of the riding toy 10 and the generating motor 33.

Additionally, the riding toy 10 includes a grip member 60 at a rear part of the body 11.

Figure 2:
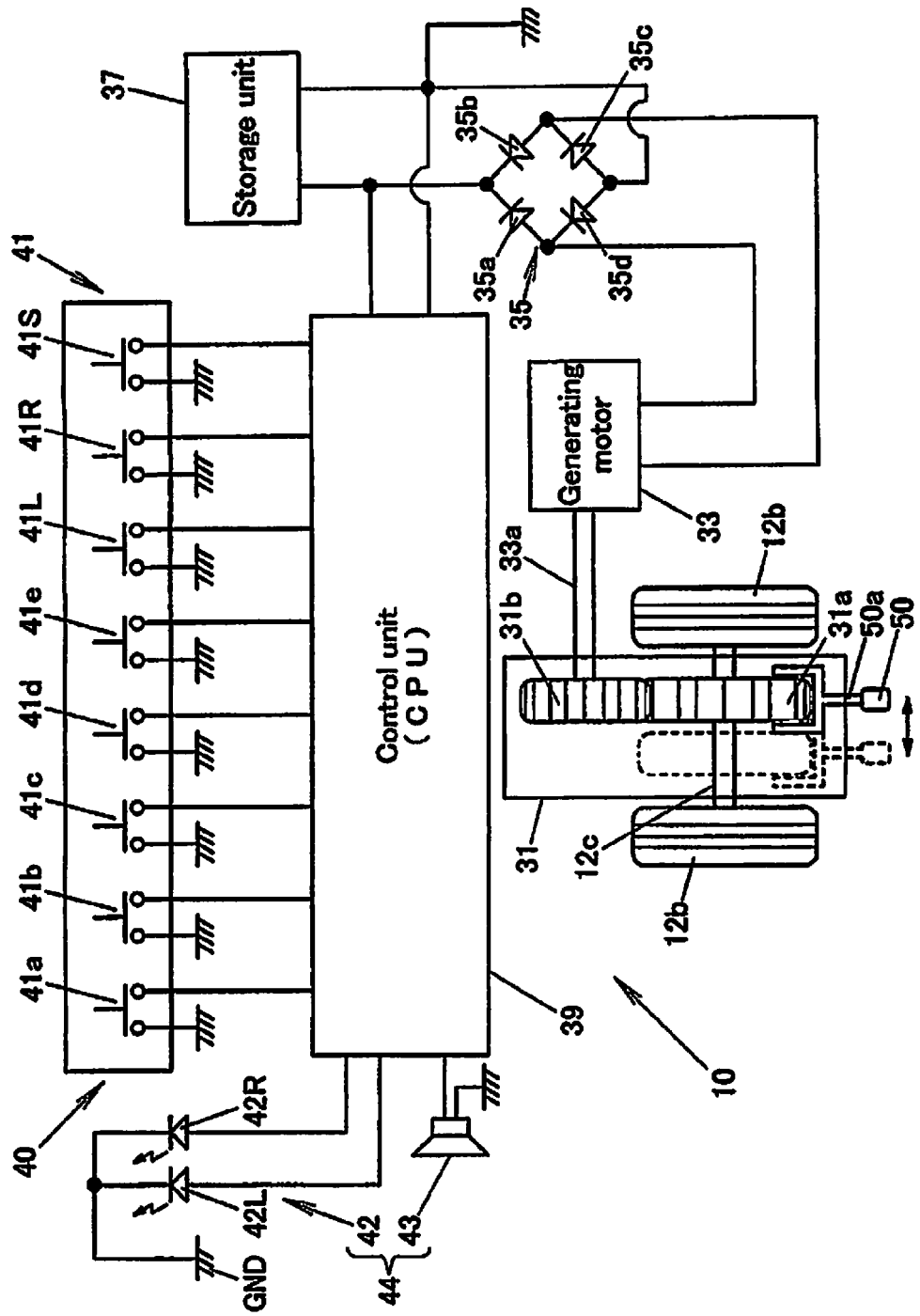
FIG. 2 is a functional block diagram of the riding toy according to the embodiment of the invention.

Hereinafter, an embodiment of the invention will be described in detail by reference to the drawings. FIG. 1 is a perspective view showing an external appearance of a riding toy 10 according to the embodiment of the invention. FIG. 2 is a functional block diagram of the riding toy 10.

As shown in FIG. 1, the riding toy 10 of the invention includes a front wheel 12a and two rear wheels 12b as wheels of the riding toy 10 and is formed into a configuration copied from a three-wheeled scooter. To describe the riding toy 10 in detail, the riding toy 10 has a body 11 which is formed from a synthetic resin material. A handlebar 13 is provided at a front part of the body 11 so as to be turned freely, and the front wheel 12a is supported rotatably on the handlebar 13 via a fork and a head tube. A front wheel cover member 12e is mounted at a lower end portion of the head tube below the handlebar 13 so as to cover the front wheel 12a from a top portion to side upper half portions thereof.

The two rear wheels 12b are supported rotatably on a lower side of the body 11 at a rear part thereof in such a manner as to allow the riding toy 10 to travel in a straight line. A semi-circular cover portion 11f is formed on each side of the body 11 so as to cover each of the rear wheels 12b from an upper portion to a side upper half portion thereof.

A hollow box-shaped seat portion 11a is formed on an upper side of the body 11 at the rear part thereof. A seat member 14 which is formed from a synthetic resin material is mounted on the seat portion 11a and has both functions as a seat and also as a lid member which can be opened and closed. To describe this in detail, the seat member 14 is pivotally supported on the seat portion 11a in a position lying near a rear end thereof. In this embodiment, a control unit 39, a storage unit 37 and the like, which will be described later, are mounted in an interior of the seat portion 11a of the body 11.

A protruding portion 11b having a protruding transverse section is formed at a central portion of the body 11, and a step-like foot rest portion 11c is formed on each of left- and right-hand sides of the protruding portion 11b.

A front cover portion 11d is formed at a front of the body 11, and a lower end portion of the front cover portion 11d is connected to the foot rest portions 11c.

The handlebar 13 includes rod-shaped handgrip portions 13a which extend horizontally from a central portion of the handlebar 13. In this embodiment, a right-hand side handgrip portion 13a is formed so as to be rotated freely about a horizontal rotational axis. A figure-shaped portion 13b which is formed of a synthetic resin material is provided at the central portion of the handlebar 13, and a control panel assembly 40 is provided on the figure-shaped portion 13b. A spherical protuberant portion 13c is formed between the figure-shaped portion and each of the handgrip portions 13a of the handlebar 13.

Next, referring to FIG. 2, functional blocks of the riding toy 10 according to the embodiment of the invention will be described.

As shown in FIG. 2, the riding toy 10 has further a power transmission mechanism 31, a generating motor 33, a rectifier bridge circuit 35, the storage unit 37 and the control unit 39.

The power transmission mechanism 31 is provided between the rear wheels 12b, which are the wheels of the riding toy 10, and the generating motor 33 so as to transmit a rotational force generated by rotation of the rear wheels 12b to the generating motor 33. To describe this in detail, the power transmission mechanism 31 has, for example, a plurality of gears 31a, 31b. The gear 31a rotates in association with an axle 12c of the rear wheels 12b and meshes with the gear 31b which is provided so as to be linked with a rotational shaft 33a of the generating motor 33. Because of this, the gear 31b rotates in association with the rotation of the rear wheels 12b, which rotates the rotational shaft 33a of the generating motor 33.

While the power transmission mechanism 31 transmits power by the plurality of gears 31a, 31b, the invention is not limited to this form. Thus, power may be transmitted by a belt, for example.

In addition, the power transmission mechanism 31 of this embodiment also includes an engaging and disengaging unit 50 which functions as an engaging and disengaging mechanism which connects and disconnects the transmission of power between the rear wheels 12b, which are the wheels of the riding toy 10, and the generating motor 33.

To describe this in detail, the engaging and disengaging unit 50 is made to bring the gear 31a and the gear 31b in an engaged state and a disengaged state in a switching fashion. In the engaging and disengaging unit 50, for example, the gear 31a is mounted on the axle 12c of the rear wheels 12b so as to slide in an axial direction of the axle 12c, so that the gear 31a and the gear 31b are brought into the engaged state and the disengaged state in the switching fashion by controlling a lever portion 50a.

In addition, in the embodiment, the transmission of power between the rear wheels 12b and the generating motor 33 is connected and disconnected by controlling the lever portion 50a. However, the invention is not limited to this form. For example, an electric mechanism may be provided in which the transmission of power between the rear wheels 12b and the generating motor 33 is connected and disconnected by controlling a button switch.

The generating motor 33 rotates in association with the rear wheels 12b via the power transmission mechanism 31 and outputs an alternating current that corresponds to the rotation thereof or a direct current that has a polarity that corresponds to the rotating direction thereof.

The rectifier bridge circuit 35 rectifies an alternating current supplied from the generating motor 33 or a direct current whose polarity is reversed according to the rotating direction of the generating motor 33, that is the traveling (namely, forwards or backwards) direction of the riding toy 10 into a direct current whose polarity coincides with the polarity of the storage unit 37 and output the direct current so rectified to the storage unit 37. The rectifier bridge circuit 35 includes a plurality of rectifier elements such as diodes or transistors, for example, diodes 35a, 35b, 35c, 35d as shown in FIG. 2 and outputs the current supplied from the generating motor 33 while matching the polarity of the current from the generating motor 33 with that of the storage unit 37.

The storage unit 37 stores the direct current supplied from the generating motor 33 via the rectifier bridge circuit 35. As the storage unit 37, a capacitor or a secondary or storage battery such as, for example, a lithium ion battery, a nickel-cadmium battery or a nickel-metal hydride battery can be adopted. A charge capacity of the storage unit 37 is set as required. In this embodiment, the charge capacity of the storage unit 37 is set to a capacity holding approximately electric power that is consumed by the control unit 39 when the control unit 39 performs a predetermined operation or operations in response to one or two to three operations of the button switches.

The control unit 39 is a CPU and is electrically connected with the storage unit 37. The control unit 39 performs a predetermined operation based on the current supplied from the storage unit 37 and stays in a waiting state without performing any operation when no current is supplied thereto. Additionally, as will be described later, the control unit 39 supplies the current from the storage unit 37 to a sound emitting device 43 or a light emitting device 42 of the output unit 44 in response to an operation of one of the button switches at the control panel assembly 40 when the current is supplied thereto from the storage unit 37. It is preferable to adopt a low power consuming electronic circuit as the control unit 39. The operation of the control unit 39 will be described in detail later.

The control panel assembly 40 has the button group 41, the light emitting device 42 and the sound emitting device 43. The light emitting device 42 and the sound emitting device 43 function as the output unit 44.

The button group 41 has a plurality of button switches. In this embodiment, as will be described later, the button group 41 has eight button switches 41a, 41b, 41c, 41d, 41e, 41L, 42R, 41S. Each button switch functions as a push-on switch, and one of terminals of the button switch is connected electrically to the control unit 39, while the other of the terminals is connected electrically to a reference potential point.

The light emitting device 42 is made up of a light emitting element such as a light emitting diode, for example, and is mounted on the body 11 or the handlebar 13 for emission of light in response to a signal from the control unit 39. In this embodiment, there are provided as the light emitting device 42 a left direction indicator light emitting device 42L and a right direction indicator light emitting device 42R.

The sound emitting device 43 is made up of a loud speaker or a sound amplification circuit, for example and is mounted on the handlebar 13 for emission of sound in response to a signal from the control unit 39. In this embodiment, the sound generating device 43 is provided in the figure-shaped portion 13b on the handlebar 13.

Figure 3:
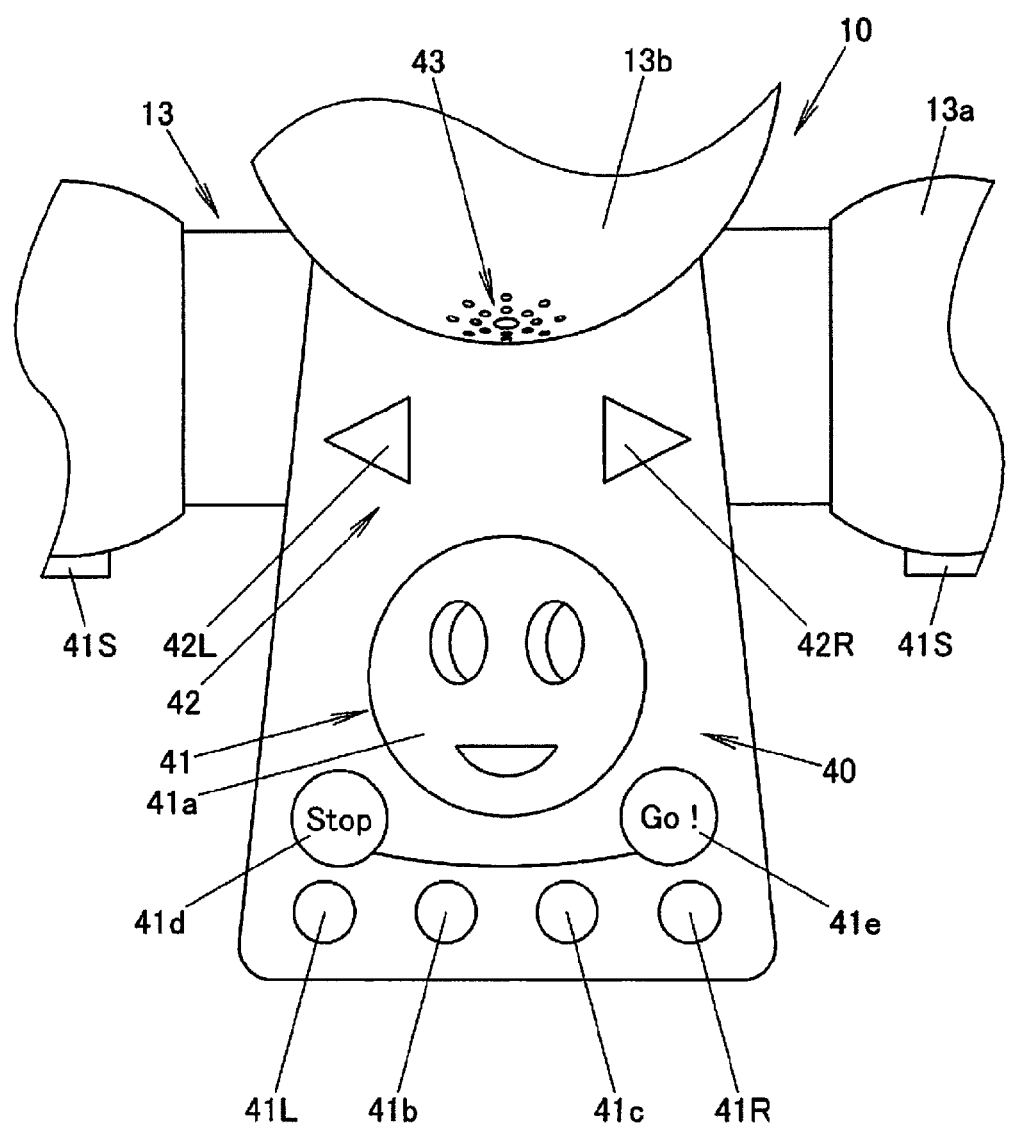
FIG. 3 is a front view of a control panel assembly of the riding toy according to the embodiment of the invention.

FIG. 3 is a top plan view of the control panel assembly 40 of the riding toy 10. As has been described above, the control panel assembly 40 is formed on the figure-shaped portion 13b that is provided on an upper side of the central portion of the handlebar 13. As shown in FIG. 3, the button group 41 and the light emitting device 42 are disposed on the control panel assembly 40.

The button group 41 has a left direction indicator button switch 41L, a right direction indicator button switch 41R, a horn sound emitting button switch 41a, an engine starting sound emitting button switch 41b, a voice emitting button switch 41c, a riding toy stopping sound emitting button switch 41d and a riding toy starting tire noise emitting button switch 41e.

The horn sound emitting button switch 41a, which is a large-sized button switch, is disposed at a central portion of the control panel assembly 40, and four small button switches which are the left direction indicator button switch 41L, the engine starting sound emitting button switch 41b, the voice emitting button switch 41c and the right direction indicator button switch 41R are disposed into a horizontal row sequentially in that order from the left to the right near a lower end portion of the control panel assembly 40. In addition, the riding toy stopping sound emitting button switch 41d and the riding toy starting tire noise emitting button switch 41e, which are medium-sized button switches, are disposed at an intermediate portion on the control panel assembly 40 which lies between the large-sized button switch and the small-sized button switches. Additionally, a changeover button switch 41S that controls the engaging and disengaging mechanism may be formed on each of the spherical protuberant portions which are formed between the handgrip portions 13a and the figure-shaped portion 13b of the handlebar 13.

The horn sound emitting button switch 41a is formed into a face, for example. When the horn sound emitting button switch 41a is operated, the control unit 39 executes a control to cause a horn sound to be emitted from the sound emitting device 43.

The left direction indicator button switch 41L is a button switch that activates a left direction indicator. When the left direction indicator button switch 41L is operated, the control unit 39 executes a control to cause the left direction indicator to flash at predetermined intervals and also executes a control to cause a flashing sound to be emitted from the sound emitting device 43.

The right direction indicator button switch 41R is a button switch that activates a right direction indicator. When the right direction indicator button switch 41R is operated, the control unit 39 executes a control to cause the right direction indicator to flash at predetermined intervals and also executes a control to cause a flashing sound to be emitted from the sound emitting device 43.

The engine starting sound emitting button switch 41b is a button switch that causes an artificial sound copied from a starting sound of an engine to be emitted. When the engine starting sound emitting button switch 41b is operated, the control unit 39 executes a control to cause the artificial sound to be emitted from the sound emitting device 43.

The voice emitting button switch 41c is a button switch that causes a preset voice to be emitted. When the voice emitting button switch 41c is operated, the control unit 39 executes a control to cause the preset voice to be emitted from the sound emitting device 43.

The riding toy stopping sound emitting button switch 41d is a button switch that causes an artificial sound copied from a squeal of slipping tires produced when a vehicle is stopped abruptly to be emitted. When the riding toy stopping sound emitting button switch 41d is operated, the control unit 39 executes a control to cause the artificial sound to be emitted from the sound emitting device 43.

The riding toy starting tire noise emitting button switch 41e is a button switch that causes an artificial sound copied from a squeal of slipping tires produced when a vehicle is started abruptly to be emitted. When the riding toy starting tire noise emitting button switch 41e is operated, the control unit 39 executes a control to cause the artificial sound to be emitted from the sound emitting device 43.

The light emitting device 42 is disposed further forwards than the button group 41 on the control panel assembly 40. Specifically speaking, the left direction indicator light emitting device 42L, having a triangular shape and made up of a light emitting element such as a light emitting diode, is formed in a front leftward position, and the right direction indicator light emitting device 42R, having a triangular shape and made up of a light emitting element such as a light emitting diode, is formed in a front rightward position on the control panel assembly 40.

How to use the riding toy 10 according to the embodiment of the invention will be described. When the riding toy 10 is used initially, the storage unit 37 is not yet charged.

When the riding toy 10 is in a stopped state, for example, when no infant rides on the riding toy 10 or when the riding toy 10 travels neither forwards nor backwards with an infant riding thereon, the rear wheels 12b do not rotate, and the generating motor 33 generates no electric energy. When no current is supplied thereto, the control unit 39 is in awaiting state. Thus, even when the button switches of the button group 41 of the control panel assembly 40 are operated by the rider, the predetermined controls to emit the sounds and light are not executed by the control unit 39.

Then, the riding toy 10 is moved forwards or backwards, for example, by the infant who is seated on the seat member 14 of the riding toy 10 as the rider and kicks on the ground with its feet. Then, the rear wheels 12b, which are the wheels of the riding toy 10, rotates forwards or backwards, whereby the axle 12c, the gear 31a, the gear 31b and the rotational shaft 33a rotate in predetermined directions, causing the generating motor 33 to generate electric energy.

The rectifier bridge circuit 35 rectifies an output current outputted from the generating motor 33, and the storage unit 37 stores a direct current from the rectifier bridge circuit 35. Then, the control unit 39 waits for the button switches to be operated by the rider.

In this state, when any of the button switches of the control panel assembly 40 on the handlebar 13 is operated by the infant, the control unit 39 executes the control designated by the button switch so operated. For example, when the voice emitting button switch 41c is operated, the control unit 39 executes a control to cause a voice of a popular character to be emitted from the sound emitting device 43. Additionally, when the left direction indicator button switch 41L is operated, the control unit 39 executes the control to cause the left direction indicator light emitting device 42L to flash at the predetermined intervals and also executes the control to cause the direction indicator flashing sound to be emitted from the sound emitting device 43.

Namely, when the infant riding on the riding toy 10 depresses the individual button switches while kicking on the ground with its feet to move the riding toy 10, the voice of the popular character is caused to be emitted from the sound emitting device 43 and the light emitting device 42 is caused to flash. Thus, the infant can be urged to take exercise with pleasure.

Then, for example, when the control unit 39 executes one or two to three controls that are designated by the button switches depressed, the electric power stored in the storage unit 37 is consumed, and the stored electric energy of the storage unit 37 becomes zero or is reduced to or below a threshold. With the stored electric energy of the storage unit 37 being zero or being reduced to or below the threshold, no current is supplied to the control unit 39. Thus, even when the rider operates the button switches of the control panel assembly 40, the control unit 39 stays in the waiting state without executing any of the predetermined controls.

In the embodiment, while the body 11 of the riding toy 10 is designed to be moved forwards or backwards by the infant riding on the riding toy 10 and kicking on the ground with its own feet, the invention is not limited to this form.

Figure 4:
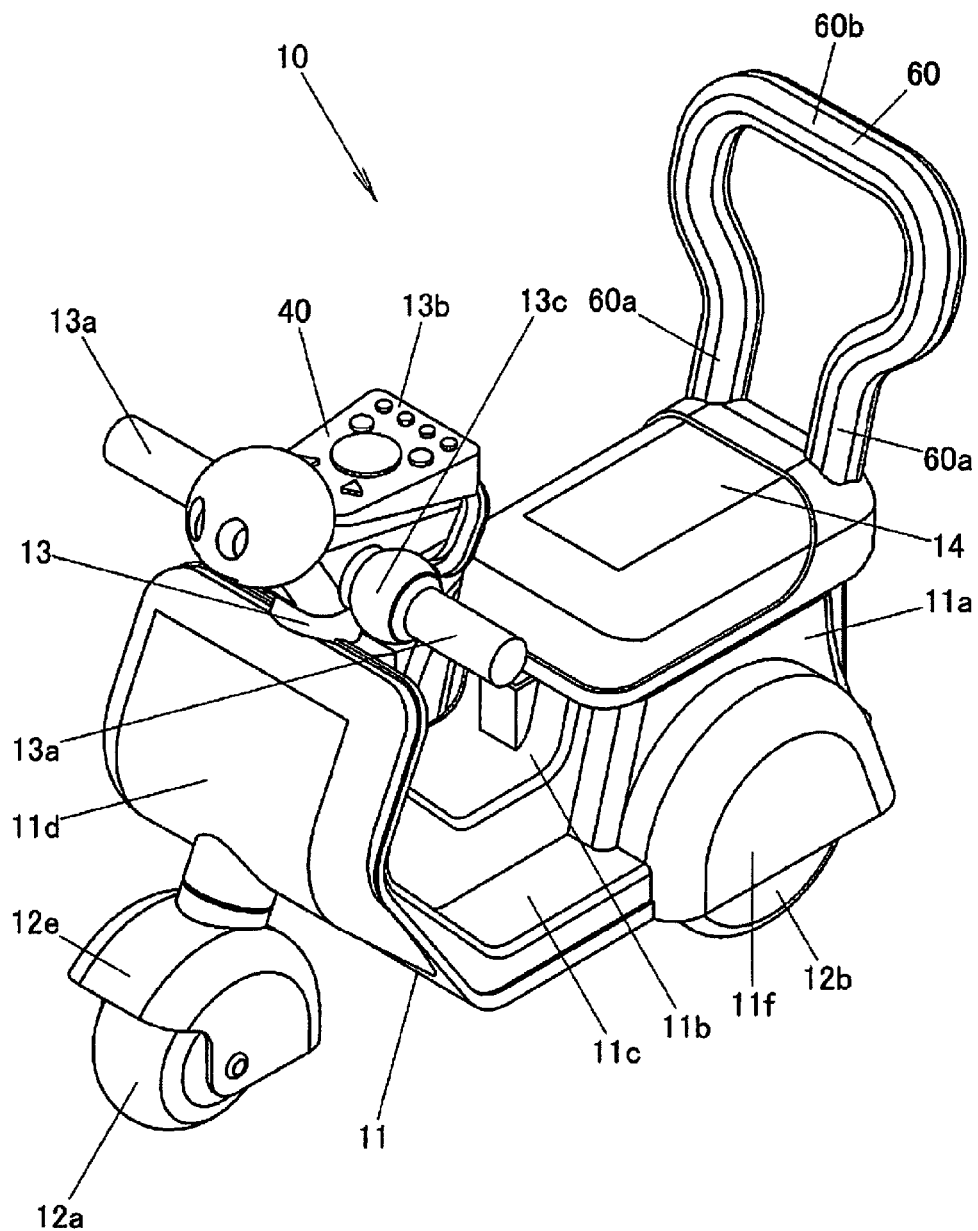
FIG. 4 is an external perspective view of a riding toy according to a modified example made to the embodiment of the invention.

For example, as shown in FIG. 4, a configuration may be adopted in which a grip member 60 is provided at a rear part of the body 11 of the riding toy 10. To describe this in detail, this grip member 60 includes two left and right strut portions 60a that are mounted at a rear part of the seat member 14 and a handgrip portion 60b which is provided so as to connect the two strut portions 60a together at upper ends thereof.

For example, a protector of the infant who is riding on the riding toy 10 grips on the handgrip portion 60b of the grip member 60 to push forwards or pull backwards the grip member 60, whereby the body 11 is moved forwards or backwards accordingly. Then, as the body 11 moves, the rear wheels 12b, which are the wheels of the riding toy 10, rotate forwards or backwards accordingly. When the rear wheels 12b rotate forwards or backwards, the generating motor 33 generates electric energy. Actions to be taken thereafter will be similar to those described heretofore, and hence, the description thereof will be omitted here.

In the embodiment, while the control unit 39 is provided on the body 11, the invention is not limited to this form. For example, the control unit 39 may be provided on the handlebar 13. By adopting this configuration, a power supply wiring may only have to be laid down between the control unit 39 and the storage unit 37 provided on the body 11, and a wiring that is laid down between the control unit 39 and the button group 41 can be made shorter, resulting in a simple construction.

In addition, in the embodiment, while the light emitting device 42 is provided on the handlebar 13, the invention is not limited to this form. For example, a decorative light emitting device may be provided on the body 11. Additionally, in the embodiment, while the loud speaker is provided on the handlebar 13 as the sound emitting device 43, there will be no problem even in the event that the loud speaker is provided on the body 11.

Additionally, in the embodiment, while the button group 41 is provided on the handlebar 13, the invention is not limited to this form. For example, a configuration may be adopted in which the button switches are provided on the body 11 or the grip member 60 so that not only the infant but also the protector can operate the button switches.

Thus, as has been described heretofore, according to the riding toy 10 of the invention, the handlebar 13 and the rotatable front wheel 12a and the rotatable two rear wheels 12b are provided on the body 11. The button switches of the button group 41 are provided on the body 11 or the handlebar 13. The output device 44 made up of the sound emitting device 43 or the light emitting device 42 is provided on the handlebar 13. Additionally, there are provided the generating motor 33 that is linked with the rear wheels 12b via the power transmission mechanism 31, the rectifier bridge circuit 35 that rectifies the output current outputted from the generating motor 33, the storage unit 37 that stores the direct current from the rectifier bridge circuit 35, and the control unit 39 that causes the light emitting device 42 or the sound emitting device 43 of the output unit 44 to execute the predetermined operation in response to operation of the relevant button switch of the button group 41 based on the current supplied from the storage unit 37.

Namely, in the riding toy 10, the sound emitting device 43 emits the sound or the light emitting device 42 emits the light in response to operation of the relevant button switch while the riding toy 10 is moving, whereas when the riding toy 10 is stopped, even when the button switches are operated, the sound emitting device 43 emits no sound and the light emitting device 42 emits no light. Therefore, for example, the infant can take exercise while enjoying listening to the voice of the character emitted from the sound emitting device 43 or looking at the light emitting device 42 flashing as a result of depressing the button switches while running the riding toy 10. However, once the riding toy 10 stops, neither sound nor light is emitted even when the infant depresses the button switches. Thus, the infant wants to run the riding toy 10 so that the infant can enjoy depressing the button switches. Namely, it is possible to provide the riding toy 10 which can urge the infant to take exercise while preventing the infant from getting tired of exercise.

In addition, according to the riding toy 10 of the invention, the rectifier bridge circuit 35 is provided between the generating motor 33 and the storage unit 37. Therefore, it is possible to provide the riding toy 10 that can charge the storage unit 37 even though the body 11 is moved forwards or backwards.

Further, according to embodiment of the invention, the handlebar 13 includes the control panel assembly 40 on which the button group 41 is formed where the plurality of button switches are disposed. The control unit 39 causes the sound emitting device 43 or the light emitting device 42 to perform the predetermined operations in response to operation of the relevant button switches based on the current supplied from the storage unit 37. Thus, for example, the infant depresses the button switches of the button group 41 provided on the handlebar 13 for easy operation by the infant while running the riding toy 10, whereby the infant can take exercise while enjoying listening to the various sounds emitted from the sound emitting device 43 or looking at the light emitting device 42 flashing. Namely, it is possible to provide the riding toy 10 that can urge the infant to take exercise while preventing the infant from getting tired of exercise.

Furthermore, according to the embodiment of the invention, the power transmission mechanism 31 includes the engaging and disengaging unit 50 that connects and disconnects the transmission of power between the rear wheels 12*b*, which are the wheels of the riding toy 10, and the generating motor 33. Therefore, it is possible to provide the riding toy 10 which can reduce the load borne by the infant in taking exercise by, for example, reducing the rotational resisting force of the rear wheels 12*b* as a result of the transmission of power being disconnected between the rear wheels 12*b*, which are the wheels of the riding toy 10, and the generating motor 33 by controlling the lever portion 50*a*.

In addition, according to the embodiment of the invention, the grip member 60 is provided at the rear part of the body 11, and therefore, for example, by the protector of the infant who is riding on the riding toy 10 gripping on the handgrip portion 60*b* of the grip member 60 to push forwards or pull backwards the grip member 60 to move the body 11 accordingly, the predetermined operations corresponding to the forward or backward motion of the body 11 can be performed, thereby making it possible to provide the riding toy 10 that can easily assist the infant in taking exercise and which can reduce the load borne by the infant in taking exercise.

While the invention has been described based on the specific embodiment, the embodiment is presented as the example, and hence, there is no intention to limit the scope of the invention by the embodiment. This novel embodiment can be carried out in other various forms, and various omissions, replaces or modifications can be made thereto without departing from the spirit and scope of the invention. The embodiment and its modified examples are included in the spirit and scope of the invention and are also included in the scopes of the inventions described in claims and their equivalents.

What is claimed is:

1. A riding toy in which a handlebar is provided on a body thereof, the riding toy comprising:
   a seat member configured to support a rider, wherein the riding toy is configured to be moved forwards or backwards by the rider engaging a foot on the ground while seated on the seat member;
   a front wheel supported rotatably on the handlebar;
   two rear wheels supported rotatably on lower sides of the body at a rear part of the body;
   a button switch provided on the body or the handlebar;
   an output unit that is provided on the handlebar and which is made up of a light emitting device or a sound emitting device;
   a generating motor that is linked with the two rear wheels via a power transmission mechanism;
   a rectifier bridge circuit that rectifies an output current outputted from the generating motor, wherein the output current is generated by the generating motor in response to the riding toy being moved forwards or backwards;
   a storage unit that stores a direct current from the rectifier bridge circuit, wherein the output unit is configured to be activated by the direct current from the rectifier bridge circuit when the riding toy is moved forwards or backwards; and
   a control unit that causes the light emitting device or the sound emitting device of the output unit to operate by emitting light or sound, respectively, in response to operation of the button switch based on a supply current from the storage unit,
   wherein the power transmission mechanism comprises a selectable engaging and disengaging unit that is adapted to connect and disconnect a transmission of power from the two rear wheels to the generating motor, wherein the selectable engaging and disengaging unit includes a moveable gear which is movable along a rotary axis of the two rear wheels, the moveable gear configured to be engaged or disengaged with a generating motor side gear which is provided at the generating motor by causing the moveable gear to move along the rotary axis in response to an operation of the selectable engaging and disengaging unit, and wherein a charge capacity of the storage unit is set to hold approximately an amount of electric power that is consumed by making the light emitting device or the sound emitting device operate several times.

2. A riding toy as set forth in claim 1, wherein the handlebar comprises a control panel assembly in which the button switch is disposed.

3. A riding toy as set forth in claim 2, further comprising:
   a grip member which is provided at the rear part of the body.

4. A riding toy as set forth in claim 1, further comprising:
   a grip member which is provided at the rear part of the body.

5. A riding toy as set forth in claim 1, wherein the selectable engaging and disengaging unit comprises a lever.

6. A riding toy as set forth in claim 1, wherein the storage unit comprises a capacitor.

* * * * *